United States Patent
Ryoo et al.

(10) Patent No.: US 10,237,121 B2
(45) Date of Patent: Mar. 19, 2019

(54) APPARATUS AND METHOD FOR INTERCONNECTING MULTIPLE LINEAR PROTECTION DOMAINS

(71) Applicant: ELECTRONICS AND TELECOMMUNICATIONS RESEARCH INSTITUTE, Daejeon (KR)

(72) Inventors: Jeong-dong Ryoo, Daejeon (KR); Taesik Cheung, Daejeon (KR); Kyung Gyu Chun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 116 days.

(21) Appl. No.: 15/294,705

(22) Filed: Oct. 15, 2016

(65) Prior Publication Data

US 2017/0111213 A1    Apr. 20, 2017

(30) Foreign Application Priority Data

Oct. 16, 2015   (KR) .................. 10-2015-0145005
Sep. 28, 2016   (KR) .................. 10-2016-0124603

(51) Int. Cl.

| | |
|---|---|
| *H04L 12/46* | (2006.01) |
| *H04L 29/08* | (2006.01) |
| *H04L 12/701* | (2013.01) |
| *H04L 12/725* | (2013.01) |
| *H04L 12/24* | (2006.01) |
| *H04L 12/703* | (2013.01) |

(Continued)

(52) U.S. Cl.
CPC ...... *H04L 41/0659* (2013.01); *H04L 41/0663* (2013.01); *H04L 45/28* (2013.01); *H04L 45/70* (2013.01); *H04L 41/0213* (2013.01); *H04L 43/0811* (2013.01)

(58) Field of Classification Search
CPC ........ H04L 45/70; H04L 43/0811; H04L 45/28
USPC .............................................. 370/242, 241.1
See application file for complete search history.

(56) References Cited

U.S. PATENT DOCUMENTS

| | | |
|---|---|---|
| 7,940,645 B2 | 5/2011 | Kim et al. |
| 2008/0131124 A1 | 6/2008 | Nam et al. |

(Continued)

FOREIGN PATENT DOCUMENTS

| | | |
|---|---|---|
| KR | 10-2006-0088642 A | 8/2006 |
| KR | 10-2014-0099193 A | 8/2014 |
| KR | 10-2015-0044801 A | 4/2015 |

*Primary Examiner* — Asad N Nawaz
*Assistant Examiner* — Jason A Harley
(74) *Attorney, Agent, or Firm* — LRK Patent Law Firm

(57) ABSTRACT

A linear protection switching-based domain connecting method includes determining, by a protection interconnecting node, a user traffic transceiving path based on information on a presence or absence of defect in working paths and protection paths, generating working path control information and protection path control information based on information on the determined user traffic transceiving path and the information on the presence or absence of the defect in the protection paths, and transmitting the generated working path information to the working interconnecting node, and connecting two paths among the protection paths, and the connection path based on the protection path control information.

17 Claims, 9 Drawing Sheets

(51) Int. Cl.
*H04L 12/721* (2013.01)
*H04L 12/26* (2006.01)

(56) References Cited

U.S. PATENT DOCUMENTS

| | | | | |
|---|---|---|---|---|
| 2009/0059799 | A1* | 3/2009 | Friskney | H04L 41/0681 370/241.1 |
| 2012/0224494 | A1* | 9/2012 | Kataoka | H04L 12/462 370/244 |
| 2014/0219080 | A1* | 8/2014 | Kim | H04L 45/22 370/221 |

* cited by examiner

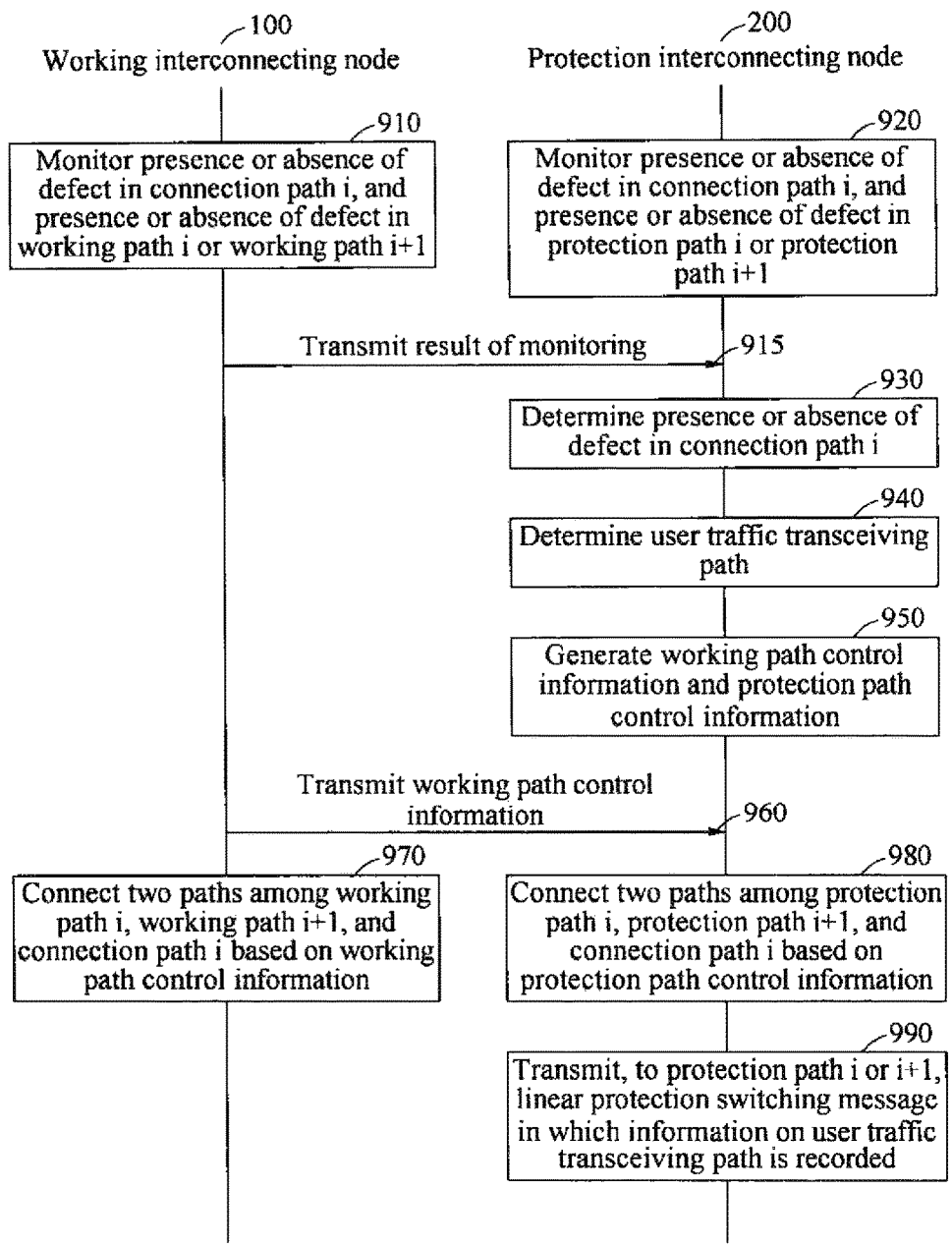

APPARATUS AND METHOD FOR INTERCONNECTING MULTIPLE LINEAR PROTECTION DOMAINS

CROSS-REFERENCE TO RELATED APPLICATIONS

This application claims priority to Korean Patent Application No. 10-2015-0145005 filed on Oct. 16, 2015, and Korean Patent Application No. 10-2016-0124603 filed on Sep. 28, 2016, in the Korean Intellectual Property Office, the disclosure of which is incorporated herein by reference for all purposes.

BACKGROUND

1. Field

One or more example embodiments relate to an apparatus and method for connecting two domains to be protected by a linear protection switching method using two interconnecting nodes.

2. Description of Related Art

An existing linear protection switching method may protect a physical or logical connection between two end nodes in a single protected or protection domain. An end node may be connected to another end node through a working path and a protection path. A protection switching process that is performed at each end node may allow two end nodes to exchange user traffic using the same path by exchanging information required for protection switching through the protection path.

A single node interconnection method may achieve traffic protection switching between end nodes by applying the existing linear protection switching method to each of two protection domains without a change. However, when a defect occurs at an interconnecting node, traffic between two end nodes may be disconnected.

SUMMARY

An aspect of the present disclosure provides a method of protecting user traffic that is transmitted and received between end nodes at both ends in an event of occurrence of a defect using two interconnecting nodes and a path connecting the interconnecting nodes when connecting two protection domains, and also each end node may use an existing linear protection switching method without a change.

According to an aspect, there is provided a working interconnecting node apparatus including an operations, administration, and maintenance (OAM) 1 connected to a working path i and configured to monitor a presence or absence of a defect in the working path i, an OAM 2 connected to a working path i+1 and configured to monitor a presence or absence of a defect in the working path i+1, an OAM 3 connected to a connection path i connecting the working interconnecting node and a protection interconnecting node paired with the working interconnecting node and configured to monitor a presence or absence of a defect in the connection path i, an end interconnection controller configured to transmit information on the presence or absence of the defect received from the OAM 1, the OAM 2, and the OAM 3 to the protection interconnecting node, and transfer working path control information received from the protection interconnecting node to a working path connector, and the working path connector configured to connect two paths among the working path i, the working path i+1, and the connection path i based on the working path control information.

According to another aspect, there is provided a protection interconnecting node apparatus including an OAM configured to monitor a presence or absence of a defect in a connection path i connecting the protection interconnecting node and a working interconnecting node paired with the protection interconnecting node, an OAM and protection (OAM&P) 1 or an OAM&P 2 connected to a protection path i or a protection path i+1 and configured to monitor a presence or absence of a defect in the protection path i or the protection path i+1, a linear protection switching processor i or a linear protection switching processor i+1 configured to determine a user traffic transceiving path, which is the path that is used for transporting user traffic, based on information on a presence or absence of a defect in the working path i or the working path i+1 and information on the presence or absence of the defect in the protection path i or the protection path i+1, and transmit information on the determined user traffic transceiving path to a main interconnection controller, the main interconnection controller configured to generate working path control information and protection path control information after receiving the information on the user traffic transceiving path and the information on the presence or absence of the defect in the protection path i or the protection path i+1, and transmit the generated working path control information and the generated protection path control information to the working interconnecting node and a protection path connector, respectively, and the protection path connector configured to connect two paths among the protection path i, the protection path i+1, and the connection path i based on the protection path control information.

According to still another aspect, there is provided a linear protection switching-based domain connecting method including monitoring, by a working interconnecting node, a presence or absence of a defect in a working path i, a working path i+1, and a connection path i connected to a protection interconnecting node paired with the working interconnecting node, and transmitting a result of the monitoring to the protection interconnecting node, monitoring, by the protection interconnecting node, a presence or absence of a defect in the connection path i, a protection path i, and a protection path i+1, determining, by the protection interconnecting node, a user traffic transceiving path, which is the path that is used for transporting user traffic, based on information on the presence or absence of the defect in the working path i and the working path i+1 and information on the presence or absence of the defect in the protection path i and the protection path i+1, generating, by the protection interconnecting node, working path control information and protection path control information based on information on the determined user traffic transceiving path and the information on the presence or absence of the defect in the protection path i and the protection path i+1, transmitting, by the protection interconnecting node, the working path control information to the working interconnecting node, and connecting, by the protection interconnecting node, two paths among the protection path i, the protection path i+1, and the connection path i based on the protection path control information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIG. 9 is a diagram illustrating a signal flow of a linear protection switching-based domain connecting method according to an example embodiment.

DETAILED DESCRIPTION

Figure 1:
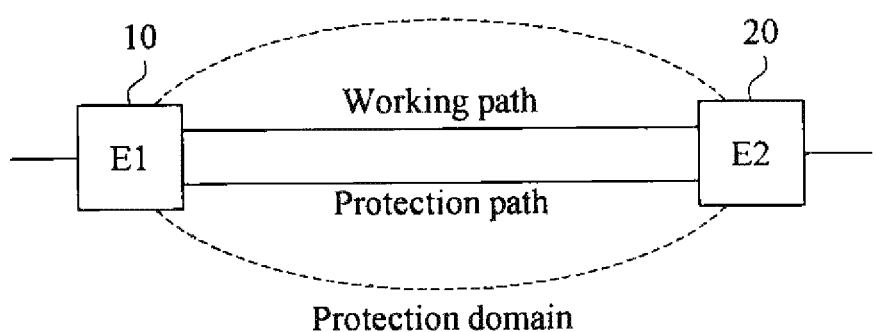
FIG. 1 is a diagram illustrating a protection domain using a linear protection switching method.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure. Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The term "path" used herein may refer to a passage through which user traffic is transferred between two nodes, and another node may be present in the path between the two nodes. A single path may be present in a single physical link or port, or a plurality of paths may be logically present in a single physical link or port. Alternatively, a plurality of physical links or ports may be configured as a single logical path.

A method of protecting user traffic using a detour based on occurrence or disappearance of a defect in a path will be described hereinafter. In general, protection switching technology may include various commands for a network operator to divert user traffic to another path as necessary other than the occurrence of a defect. The commands may include, for example, a forced switch (FS), a manual switch (MS), a lockout of protection, and the like. The term "defect" used herein may include a substantial defect, such as, for example, a signal fail (SF) and a signal degrade (SD), and also the commands of the operator described in the foregoing.

FIG. 1 is a diagram illustrating a protection domain using a linear protection switching method.

Referring to FIG. 1, an end node E1 10 is connected to an end node E2 20 through a working path and a protection path. Although an intermediate node may be present in each path, all intermediate nodes may perform only a function of transferring user traffic and may not perform an operation for protection switching, and thus the intermediate nodes are omitted here for convenience of description.

A protection switching process to be performed at each of the end nodes E1 10 and E2 20 may allow the two end nodes E1 10 and E2 20 to exchange user traffic using the same path by exchanging information required for the protection switching through the protection path.

For example, the two end nodes E1 10 and E2 20 may exchange the user traffic using the working path in a normal state, and the two end nodes E1 10 and E2 20 may exchange the user traffic using the protection path through information exchange between protection switching processes when a defect in the working path is detected by any one of the two end nodes E1 10 and E2 20.

An existing linear protection switching method may include, for example, International Telecommunication Union (ITU) Telecommunication Standardization Sector (ITU-T) recommendations G. 8031 (Ethernet linear protection switching), G. 8131 (multiprotocol label switching-transport profile [MPLS-TP] linear protection switching), and G. 873.1 (optical transport network [OTN] linear protection switching), and Internet Engineering Task Force (IETF) request for comments (RFC) 6378 (MPLS-TP linear protection switching—protection state coordination [PSC] mode) and RFC 7271 (MPLS-TP linear protection switching—automatic protection switching [APS] mode).

Figure 2:
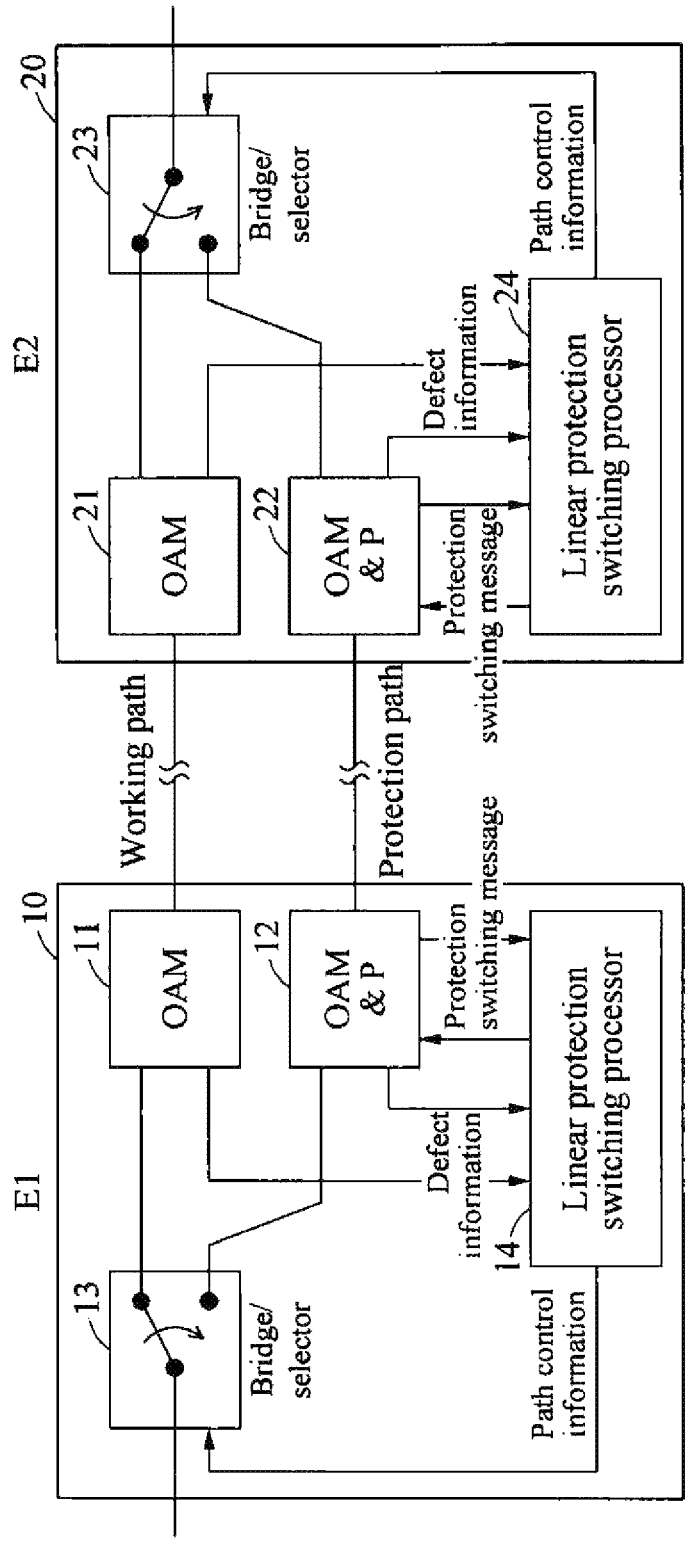
FIG. 2 is a diagram illustrating a configuration of an end node to perform a linear protection switching method.

FIG. 2 is a diagram illustrating an internal configuration of an end node to perform linear protection switching.

Referring to FIG. 2, each of end nodes E1 10 and E2 20 includes an operations, administration, and maintenance (OAM) 11 or 21, respectively, to detect a defect in a working path, and an OAM and protection (OAM&P) 12 or 22, respectively, to detect a defect in a protection path and transmit or receive a protection switching message through the protection path.

Various methods may be applied to monitor a state of the working path or the protection path. For protection switching, any monitoring methods may be used to perform the protection switching once defect information of the working path and the protection path that indicates a normal state, a signal failure (SF), or a signal degradation (SD) is provided.

In addition, the end nodes E1 10 and E2 20 include respective bridges to selectively transmit, to the working path or the protection path, user traffic to flow in a protection domain under the control of respective linear protection switching processors 14 and 24, and include respective selectors to select the working path or the protection path and send traffic to be received from the selected path to outside of the protection domain. In FIG. 2, each bridge and each selector are illustrated as a single block, for example, a bridge/selector 13 and a bridge/selector 23, and thus bidirectional traffic is transmitted and received to and from the working path or the protection path. The bridges/selectors 13 and 23 may select the working path or the protection path under the control of the linear protection switching processors 14 and 24, for example, based on path control information, and transfer the user traffic through the selected path.

A linear protection switching processor of each end node may receive, as an input, defect information of the working path, defect information of the protection path, and a protection switching message received from a counterpart end node, and may control a bridge/selector based on a linear protection switching mechanism. Although not illustrated in FIG. 2, the protection switching processor may control a bridge and a selector based on the linear protection switching mechanism based further on a protection switching command to be input from an operator.

Figure 3:
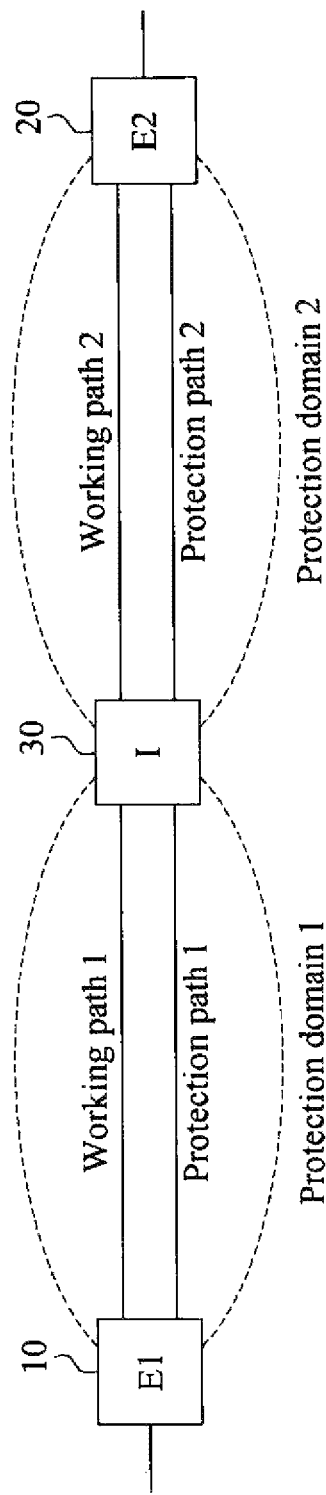
FIG. 3 is a diagram illustrating a protection domain interconnection using a signal node.

FIG. 3 is a diagram illustrating a method of connecting two protection domains to be protected by a linear protection switching method using a single interconnecting or interworking node I according to an example embodiment.

A single node interconnecting method illustrated in FIG. 3 may be a simplest method of interconnecting two protection domains, and may protect the individual protection domains by applying an existing linear protection switching method to each of the protection domains. For example, referring to FIG. 3, when a defect occurs in working path 1 in protection domain 1 and a defect simultaneously occurs in protection path 2 in protection domain 2, connecting protection path 1 and working path 2 using an interconnecting node I may protect user traffic between an end node E1 10 and an end node E2 20.

Figure 4:
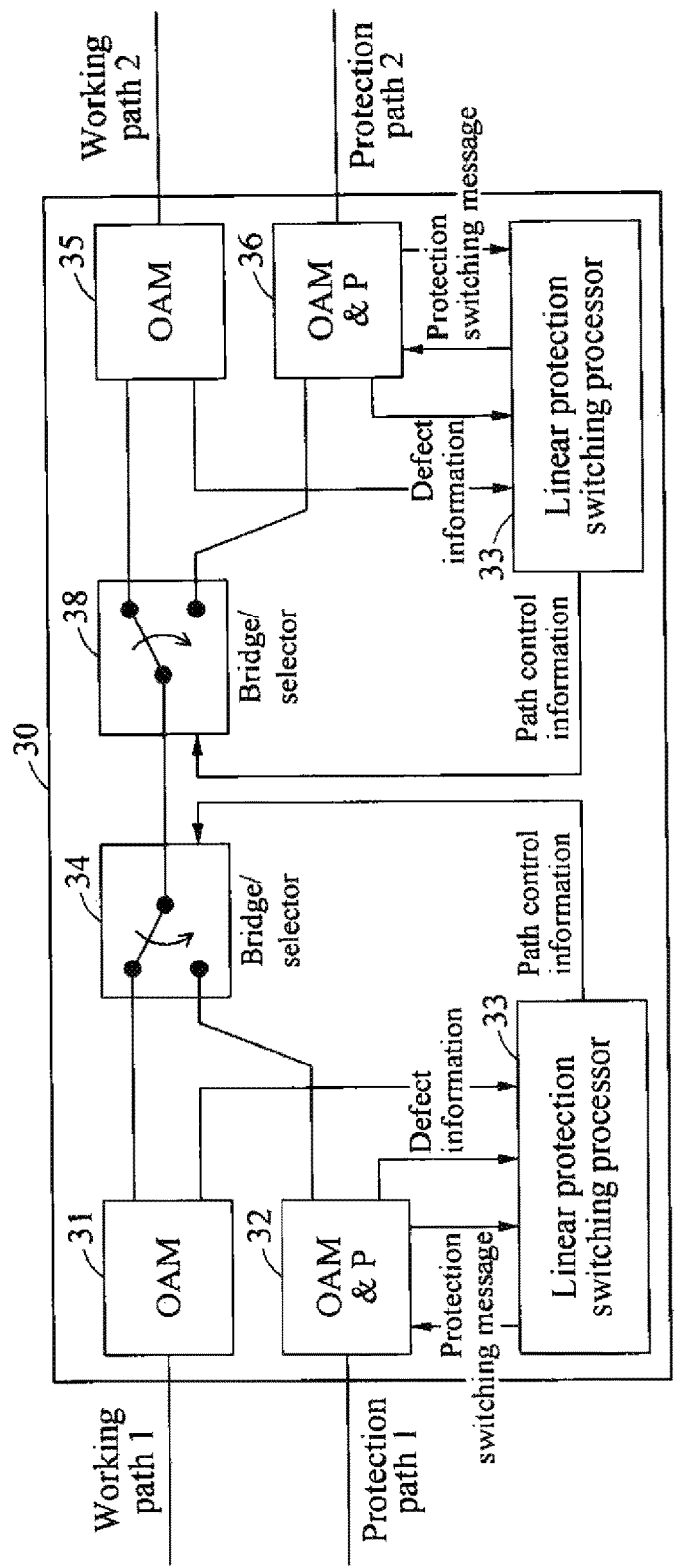
FIG. 4 is a diagram illustrating an interconnecting node in a protection domain interconnection using a single node.

FIG. 4 is a diagram illustrating an internal structure of an interconnecting node I when using the single node interconnecting method described with reference to FIG. 3.

Referring to FIG. 4, protection switching may be performed simply by connecting bridges/selectors 34 and 38 without changing a protection switching structure in existing end nodes E1 and E2.

The single node interconnecting method illustrated in FIGS. 3 and 4 may implement traffic protection switching between the end nodes E1 10 and E2 20 by applying an existing linear protection switching method to each of two protection domains without a change. However, when a defect occurs in the interconnecting node I 30, traffic between the two end nodes E1 10 and E2 20 may be disconnected.

According to an example embodiment, there is provided an apparatus and method for preventing such a disconnection of traffic when a defect occurs in an interconnecting node.

Various examples may be embodied as a network configuration including a linear protection switching domain connecting apparatus. According to an example embodiment, protection domain 1 and protection domain 2 may be connected using two interconnecting nodes I1 100 and I1' 200 as illustrated in FIG. 5.

Figure 6:
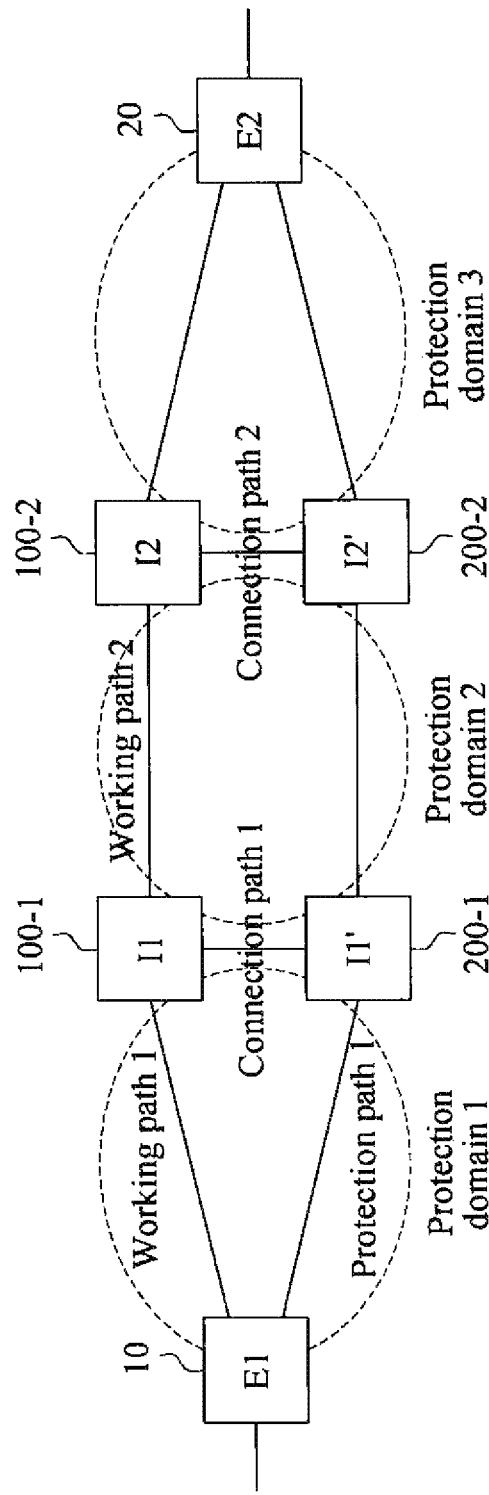
FIG. 6 is a diagram illustrating an example of a connection of three protection domains according to an example embodiment.

According to another example embodiment, three protection domains 1, 2, and 3 may be connected using two pairs of interconnecting nodes, for example, a pair of an interconnecting node I1 100-1 and an interconnecting node I1' 200-1 and a pair of an interconnecting node I2 100-2 and an interconnecting node I2' 200-2, as illustrated in FIG. 6. In the example illustrated in FIG. 6, the protection domains 1, 2, and 3 may be connected using all the four interconnecting nodes I1 100-1, I1' 200-1, I2 100-2, and I2' 200-2. In such a case, user traffic to be transceived between the end nodes E1 10 and E2 20 may be protected.

Figure 7:
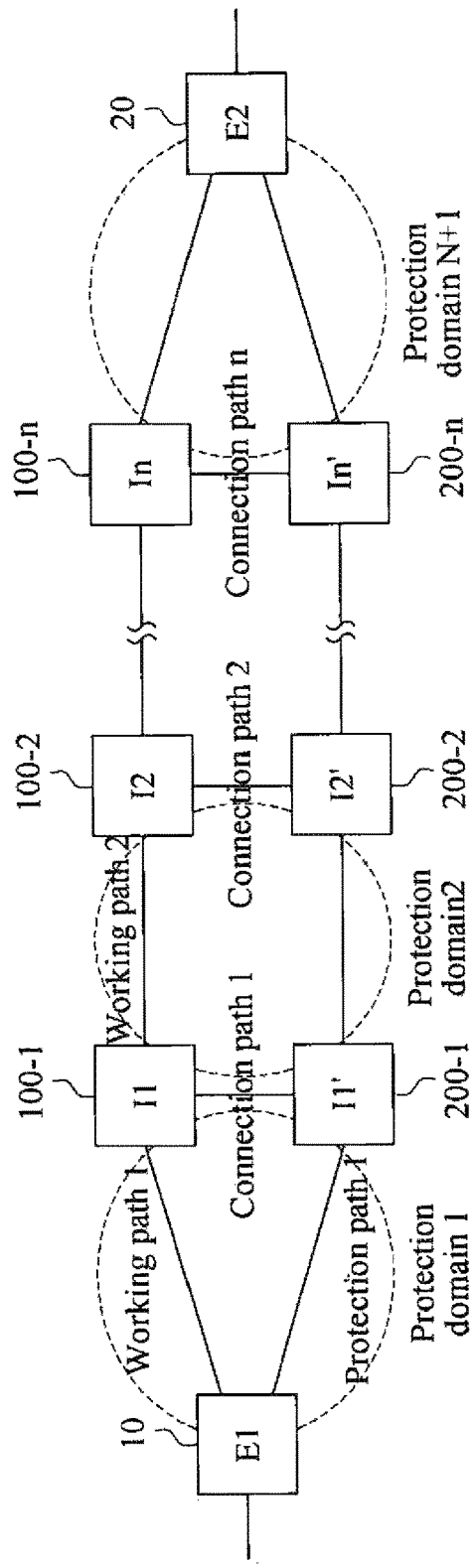
FIG. 7 is a diagram illustrating an example of a connection of n+1 protection domains according to an example embodiment.

According to still another example embodiment, a protection domain may be expanded using various pairs of interconnecting nodes, for example, an interconnecting node I1 100-1, an interconnecting node I2 100-2, . . . , an interconnecting node In 100-n, and an interconnecting node I1' 200-1, an interconnecting node I2' 200-2, . . . , and an interconnecting node In' 200-n, irrespective of the number of protection domains as illustrated in FIG. 7.

Figure 5:
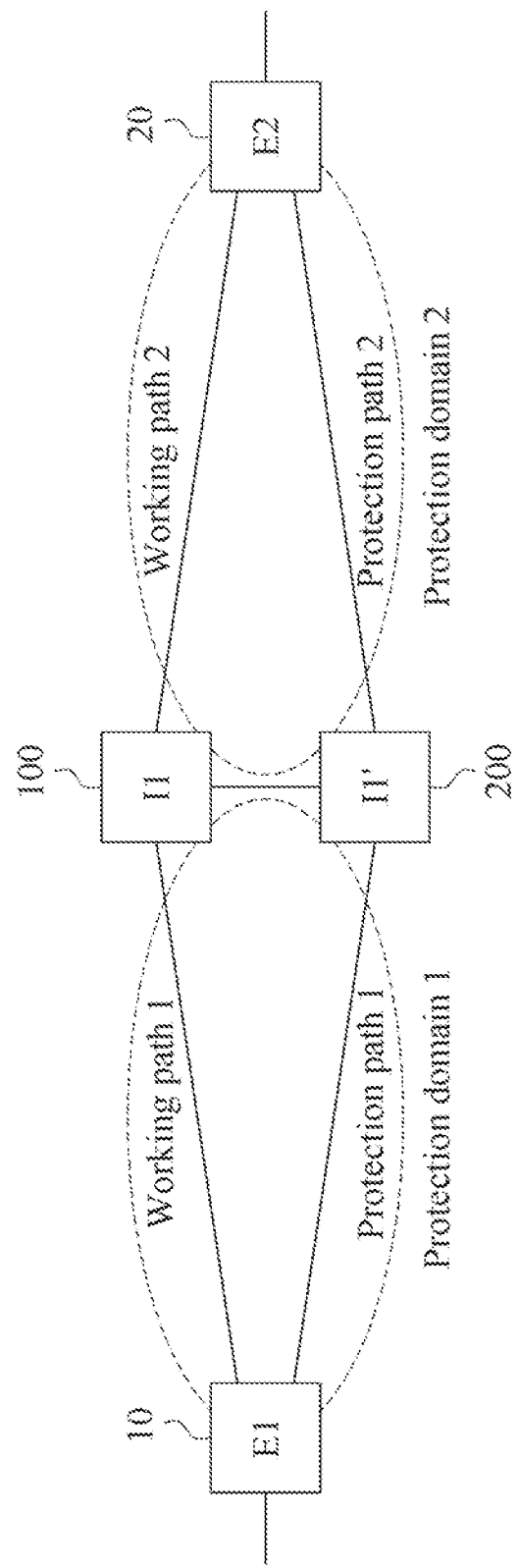
FIG. 5 is a diagram illustrating an example of a connection of two protection domains according to an example embodiment.

In FIGS. 5, 6, and 7, although a structure and an operation of each of end nodes E1 10 and E2 20 may be the same as an end node in an existing linear protection switching method, a structure and an operation of a pair of interconnecting nodes Ii and Ii' are as described herein according to example embodiments of the present disclosure.

Figure 8:
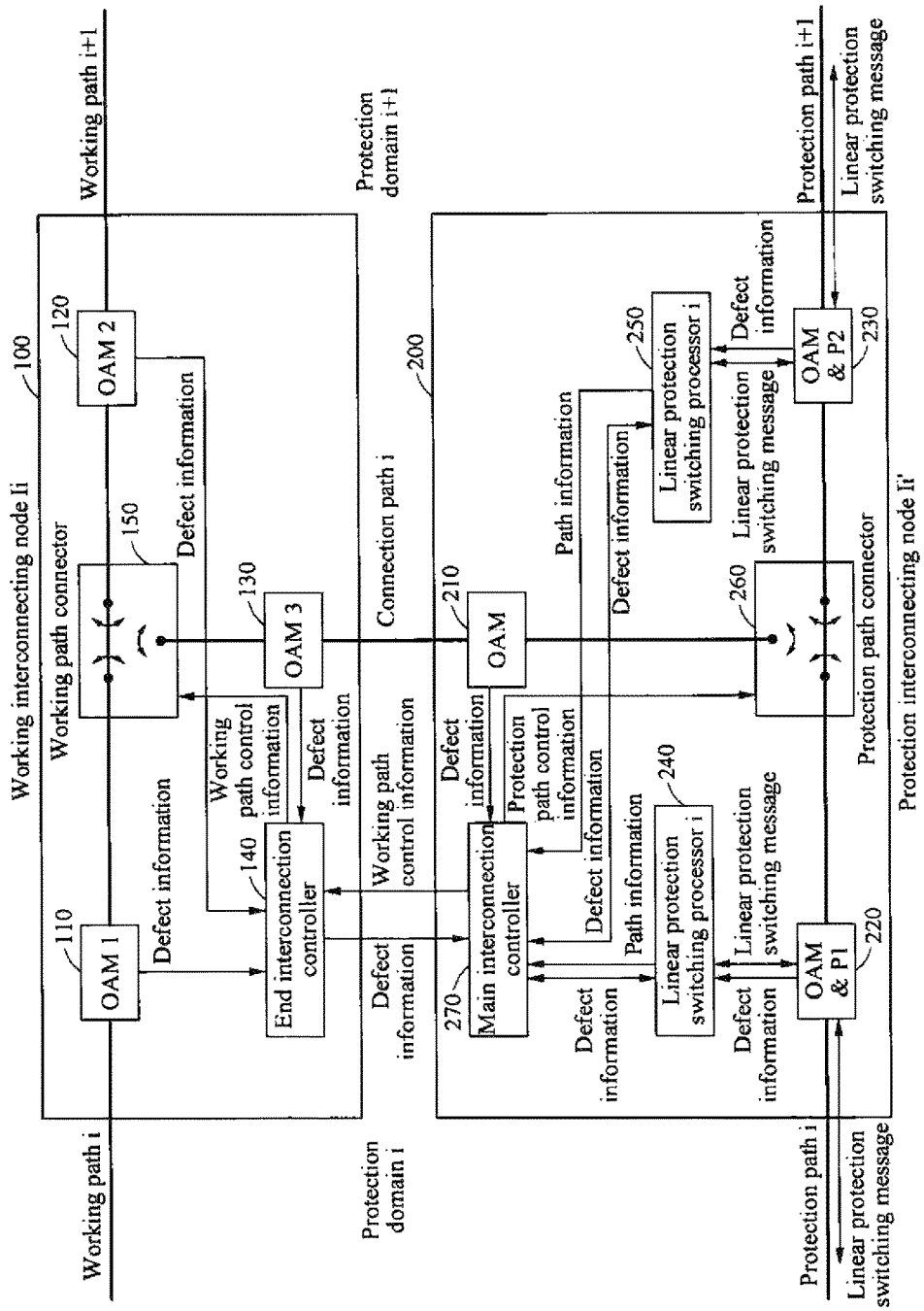
FIG. 8 is a diagram illustrating a structure of a pair of interconnecting nodes, a working interconnecting node Ii and a protection interconnecting node Ii', that connects protection domains according to an example embodiment.

FIG. 8 is a diagram illustrating a structure of a pair of interconnecting nodes that connects protection domains, for example, a pair of a working interconnecting node Ii and a protection interconnecting node Ii'. When connecting two or more protection domains as illustrated in FIGS. 5, 6, and 7, all pairs of interconnecting nodes that interconnect neighboring protection domains may have a structure illustrated in FIG. 8.

Referring to FIG. 8, a working interconnecting node Ii 100 may connect a working path i and a working path i+1, and each working path may be connected to a counterpart end node in each protection domain or the working interconnecting node Ii 100. The working interconnecting node Ii 100 may be connected to a protection interconnecting node Ii' 200 through a connection path i.

The protection interconnecting node Ii' 200 may connect a protection path i and a protection path i+1, and each protection path may be connected to a counterpart end node in each protection domain or the protection interconnecting node Ii' 200. The protection interconnecting node Ii' 200 may be connected to the working interconnecting node Ii 100 through the connection path i.

The working interconnecting node Ii 100 includes three OAMs, for example, OAM 1 110, OAM 2 120, and OAM 3 130, an end interconnection controller 140, and a working path connector 150. Such a configuration is provided as an illustrative example, and thus example embodiments of the present disclosure are not limited to the configuration. That is, a plurality of units or elements may be combined or a single unit or element may be divided, and some functions of one unit or element may be performed by another unit or element.

The OAMs 110, 120, and 130 may monitor states of the working path i, the working path i+1, and the connection path i, respectively. Various methods, for example, a method defined in an international standard or a method defined by an equipment developer, may be applied as technology for monitoring a state of a path by the OAMs 110, 120, and 130. Here, it is assumed that, irrespective of a specific method, the OAMs 110, 120, and 130 inform the end interconnection controller 140 of occurrence or disappearance of a defect in a path.

The working path connector 150 may connect only two paths among the working path i, the working path i+1, and the connection path i, and connect the two paths among the three paths under the control of the end interconnection controller 140. In FIG. 8, an example of a connection of the working path i and the working path i+1 is illustrated.

The end interconnection controller 140 may transmit, to a main interconnection controller 270 of the protection interconnecting node Ii' 200, defect information received from each of the OAMs 110, 120, and 130 and transfer, to the working path connector 150, working path control information received from the main interconnection controller 270. However, when a defect occurs in the connection path i and the working path control information is not received from the main interconnection controller 270 of the protection interconnecting node Ii' 200, the end interconnection controller 140 may generate working path control information commanding a connection of the working path i and the working path i+1 and transmit the generated working path control information to the working path connector 150.

The protection interconnecting node Ii' 200 includes an OAM 210, two OAM&Ps, for example, OAM&P 1 220 and OAM&P 2 230, two linear protection switching processors, for example, a linear protection switching processor i 240 and a linear protection switching processor i+1 250, a protection path connector 260, and the main interconnection controller 270. Such a configuration is provided as an illustrative example, and thus example embodiments of the present disclosure are not limited to the configuration. That is, a plurality of units or elements may be combined or a single unit or element may be divided, and some functions of one unit or element may be performed by another unit or element.

The OAM 210 may be a block to monitor a state of the connection path i. Various methods, for example, a method defined in an international standard or a method defined by an equipment developer, may be applied as technology for monitoring a state of a path by the OAM 210. Here, it is assumed that, irrespective of a specific method, the OAM 210 informs the main interconnection controller 270 of occurrence or disappearance of a defect in a path.

The OAM&Ps 220 and 230 may be a block to monitor a state of the protection path i or the protection path i+1, and transmit or receive a linear protection switching message. Here, the linear protection switching message, defect information, and connection control information, which are indicated in parallel with the protection path i or the protection path i+1, and the connection path i, may be transferred through each corresponding protection path and connection path, and the transfer is illustrated by an arrow for convenience of description.

Various methods, for example, a method defined in an international standard or a method defined by an equipment developer, may be applied as technology for monitoring a state of a path. Here, it is assumed that, irrespective of a specific method, the linear protection switching processors 240 and 250 may be informed of occurrence or disappearance of a defect in a path. The linear protection switching message may be exchanged between nodes at both ends of a protection path of each protection domain. The OAM&Ps 220 and 230 may transfer a linear protection switching message received from a counterpart node of a protection domain to the linear protection switching processors i 240 and i+1 250, and transmit a linear protection switching message generated by the linear protection switching processors i 240 and i+1 250 to the counterpart node of the protection domain.

Using the existing linear protection switching method, the linear protection switching processor i 240 or i+1 250 may receive, as an input, information on a presence or absence of a defect in the working path i or the working path i+1 and information on a presence or absence of a defect in the protection path i or the protection path i+1, and determine whether to transceive user traffic through the working path i (or the working path i+1) or the protection path i (or the protection path i+1). The linear protection switching processor i 240 or i+1 250 may then inform a counterpart node of a protection domain i (or a protection domain i+1) of information on a determined user traffic transceiving path, using the linear protection switching message, and inform the main interconnection controller 270 of the user traffic transceiving path information, which is indicated as path information in FIG. 8.

Here, the existing linear protection switching method performed by the linear protection switching processors i 240 and i+1 250 may include ITU-T recommendations G. 8031 (Ethernet linear protection switching), G. 8131 (MPLS-TP linear protection switching), and G. 873.1 (OTN linear protection switching), and IETF RFC 6378 (MPLS-TP linear protection switching-PSC mode) and RFC 7271 (MPLS-TP linear protection switching-APS mode). However, example embodiments of the present disclosure are not limited to a specific one of the methods described in the foregoing, and it is assumed that the linear protection switching message and the user traffic transceiving path information are generated based on the existing linear protection switching method.

The protection path connector 260 may connect two paths among the three paths—the protection path i, the protection path i+1, and the connection path i. FIG. 8 illustrates an example of a connection of the protection path i and the protection path i+1, and the two paths among the three paths may be connected under the control of the main interconnection controller 270.

The main interconnection controller 270 may transfer the defect information of the working path i received from the end interconnection controller 140 of the working interconnecting node Ii 100 to the linear protection switching processor i 240, and transfer the defect information of the working path i+1 to the linear protection switching processor i+1 250.

In addition, the main interconnection controller 270 may receive information on occurrence and disappearance of a defect in the connection path i from the end interconnection controller 140 and the OAM 210 of the protection interconnecting node Ii' 200, and permanently perceive a presence or absence of a defect in a current connection path i. Although a defect in the connection path i occurs in one direction and does not occur in an opposite direction, the main interconnection controller 270 may determine that a defect is present in the connection path i. Further, when a path through which user traffic is to be transceived changes in a protection domain managed by each of the linear protection switching processors i 240 and i+1 250, the main interconnection controller 270 may be informed, by the linear protection switching processors i 240 and i+1 250, of such a change as path information, and also receive information on occurrence and disappearance of a defect in the protection paths i and i+1. Based on such input information, the main interconnection controller 270 may generate working path control information and protection path control information, and transmit the generated information to the end interconnection controller 140 of the working interconnecting node Ii 100 and the protection path connector 260 of the protection interconnecting node Ii' 200. As necessary, the main interconnection controller 270 may input a virtual defect signal to the linear protection switching processors i 240 and i+1 25-0 to change a path of user traffic.

Table 1 below illustrates operations to be performed by the main interconnection controller 270 based on a signal to be input to the main interconnection controller 270.

TABLE 1

| Input signal (transmitter of input signal) | Operations of main interconnection controller |
| --- | --- |
| Signal associated with occurrence and disappearance of a defect in a working path i (end interconnection controller) | Transfer an input signal to a linear protection switching processor i. |
| Signal associated with occurrence and disappearance of a defect in a working path i + 1 (end interconnection controller) | Transfer an input signal to a linear protection switching processor i + 1. |
| Signal associated with occurrence and disappearance of a defect in a protection path i (linear protection switching processor i) | Record a presence or absence of a defect in a protection path i. |
| Signal associated with occurrence and disappearance of a defect in a protection path i + 1 (linear protection switching processor i + 1) | Record a presence or absence of a defect in a protection path i + 1. |
| Signal associated with occurrence of a defect in a connection path i (OAM or end interconnection controller) | Record a presence of a defect in a connection path i. Perform an operation corresponding to the 'presence of a defect in a connection path i' indicated in Table 1. |
| Signal associated with disappearance of a defect in a connection path i (OAM or end interconnection controller) | Record an absence of a defect in connection path i. In a previous presence of a virtual path defect occurrence signal for a path, transmit a virtual path defect disappearance signal that cancels the virtual path defect occurrence signal to a corresponding linear protection switching processor. Perform an operation corresponding to the 'absence of a defect in a connection path i' indicated in Table 1. |
| Path information (linear protection switching processor i or i + 1) | Record a 'path used for transceiving user traffic' in each protection domain. Perform a corresponding operation indicated in Table 1 based on a presence or absence of a defect in a connection path i. |

For convenience of description of the operations to be performed by the main interconnection controller illustrated in Table 1, Table 2 below illustrates a common operation to be performed by the main interconnection controller. Table 2 illustrates an operation based on a presence or absence of a defect in a connection path i.

TABLE 2

| Type | Operations |
| --- | --- |
| In the presence of a defect in a connection path i | Generate working path control information that commands a connection between a working path i and a working path i + 1, and transmit the generated working path control information to an end interconnection controller. Generate protection path control information that commands a connection between a protection path i and a protection path i + 1, and transmit the generated protection path control information to a protection path connector. In the presence of a defect in any one path of the protection path i and the protection path i + 1, transmit a 'virtual protection path defect occurrence signal' to a linear protection switching processor to which a protection path without a defect belongs. In the absence of a defect in both the protection path i and the protection path i + 1, transmit a 'virtual working path i defect occurrence signal' and a 'virtual working path i + 1 defect occurrence signal' to a linear protection switching processor i and a linear protection switching processor i + 1, respectively. |
| In the absence of a defect in a connection path i | Transmit, to a working path connector and a protection path connector, path control information that connects paths used for transceiving user traffic in current two protection domains (for example, when a working path i is used in a protection domain i and a protection path i + 1 is used in a protection domain i + 1, the working path control information may command a connection between the working path i and a connection path i, and the protection path control information may command a connection between the connection path i and the protection path i + 1.) |

The operations of the main interconnection controller that are illustrated in Tables 1 and 2 are explicitly described, and thus additional descriptions are omitted here. With reference to FIG. 8, the virtual protection (or working) path defect occurrence signal or the virtual protection (or working) path defect disappearance signal that is described in Tables 1 and 2 is a virtual signal associated with occurrence or disappearance of a defect that is transmitted from the main interconnection controller 270 to the linear protection switching processors i 240 and i+1 250 to connect user traffic to be transferred between protection domains. The linear protection switching processors i 240 and i+1 250 receiving such a signal may handle the received signal the same as an existing defect occurrence or disappearance signal.

The path used for transceiving user traffic that is described in Tables 1 and 2 is the same as an active path, or an active transport entity, used in existing linear protection switching technology, and may be defined as a path of a working path and a protection path in a protection domain, the path through which the user traffic is to be transceived. The path may be determined by a corresponding linear protection switching processor based on input path defect information in accordance with an existing linear protection switching algorithm.

Referring back to FIG. 8, the defect information and the working path control information may be exchanged between the working interconnecting node Ii 100 and the protection interconnecting node Ii' 200 on a periodic basis. When information to be transmitted is different from information previously transmitted, the information may be immediately transmitted regardless of a transmission cycle or period.

When the working interconnecting node Ii 100 does not receive the working path control information from the protection interconnecting node Ii' 200 for a certain amount of time, the working interconnecting node Ii 100 may determine that the protection interconnecting node Ii' 100 breaks down or that a defect occurs in the connection path i used for receiving the working path control information.

Similarly, when the protection interconnecting node Ii' 200 does not receive the defect information from the working interconnecting node Ii 100 for a certain amount of time, the protection interconnecting node Ii' 200 may determine that the working interconnecting node Ii 100 breaks down or that a defect occurs in the connection path i used for receiving the defect information.

Table 3 below illustrates a user traffic path based on a presence or absence of a defect in each path when the operations of an interconnecting node described with reference to FIG. 8 and Tables 1 and 2 are applied in a case that a pair of interconnecting nodes connects two protection domains, for example, a network illustrated in FIG. 5.

TABLE 3

Path state (○: normal, X: defective)

| V | W1 | P1 | W2 | P2 | User traffic path |
|---|----|----|----|----|-------------------|
| ○ | ○ | ○ | ○ | ○ | W1-W2 |
| ○ | ○ | ○ | ○ | X | W1-W2 |
| ○ | ○ | ○ | X | ○ | W1-V-P2 |
| ○ | ○ | ○ | X | X | none |
| ○ | ○ | X | ○ | ○ | W1-W2 |
| ○ | ○ | X | ○ | X | W1-W2 |
| ○ | ○ | X | X | ○ | W1-V-P2 |
| ○ | ○ | X | X | X | none |
| ○ | X | ○ | ○ | ○ | P1-V-W2 |
| ○ | X | ○ | ○ | X | P1-V-W2 |
| ○ | X | ○ | X | ○ | P1-P2 |
| ○ | X | ○ | X | X | none |
| ○ | X | X | ○ | ○ | none |
| ○ | X | X | ○ | X | none |
| ○ | X | X | X | ○ | none |
| ○ | X | X | X | X | none |
| X | ○ | ○ | ○ | ○ | W1-W2 |
| X | ○ | ○ | ○ | X | W1-W2 |
| X | ○ | ○ | X | ○ | P1-P2 |
| X | ○ | ○ | X | X | none |
| X | ○ | X | ○ | ○ | W1-W2 |
| X | ○ | X | ○ | X | W1-W2 |
| X | ○ | X | X | ○ | none |
| X | ○ | X | X | X | none |
| X | X | ○ | ○ | ○ | P1-P2 |
| X | X | ○ | ○ | X | none |
| X | X | ○ | X | ○ | P1-P2 |
| X | X | ○ | X | X | none |
| X | X | X | ○ | ○ | none |
| X | X | X | ○ | X | none |
| X | X | X | X | ○ | none |
| X | X | X | X | X | none |

In Table 3, O and X indicate an absence and a presence, respectively, of a defect in each corresponding path. W1 and W2 indicate working path 1 and working path 2, and P1 and P2 indicate protection path 1 and protection path 2, respectively. V indicates a connection path. In Table 3, for convenience of description, an end node and an interconnecting node are omitted in a user traffic path, and only a path to be used is indicated. For example, when a user traffic path is W1-V-P2, it indicates that user traffic uses a path of (E1)-working path 1-(I1)-connection path-(I1')-protection path 2-(E2). In Table 3, when a path through which user traffic is transferred between end nodes is absent, the user traffic path is indicated as 'none.'

Table 4 below illustrates a user traffic path based on a presence or absence of a defect in each path when the operations of an interconnecting node described with reference to FIG. 8 and Tables 1 and 2 are applied in a case that two pairs of interconnecting nodes connect three protection domains, for example, a network illustrated in FIG. 6.

TABLE 4

Path state (○: normal, X: defective)

| V1 | V2 | W1 | P1 | W2 | P2 | W3 | P3 | User traffic path |
|----|----|----|----|----|----|----|----|-------------------|
| ○ | ○ | ○ | ○ | ○ | ○ | ○ | ○ | W1-W2-W3 |
| ○ | ○ | ○ | ○ | ○ | ○ | ○ | X | W1-W2-W3 |
| ○ | ○ | ○ | ○ | ○ | ○ | X | ○ | W1-W2-V2-P3 |
| ○ | ○ | ○ | ○ | ○ | X | ○ | ○ | W1-W2-W3 |
| ○ | ○ | ○ | ○ | ○ | X | ○ | X | W1-W2-W3 |
| ○ | ○ | ○ | ○ | ○ | X | X | ○ | W1-W2-V2-P3 |
| ○ | ○ | ○ | ○ | X | ○ | ○ | ○ | W1-V1-P2-V2-W3 |
| ○ | ○ | ○ | ○ | X | ○ | ○ | X | W1-V1-P2-V2-W3 |
| ○ | ○ | ○ | ○ | X | ○ | X | ○ | W1-V1-P2-P3 |
| ○ | ○ | ○ | ○ | X | ○ | X | X | W1-V1-P2-P3 |
| ○ | ○ | ○ | X | ○ | ○ | ○ | ○ | W1-W2-W3 |
| ○ | ○ | ○ | X | ○ | ○ | ○ | X | W1-W2-W3 |
| ○ | ○ | ○ | X | ○ | ○ | X | ○ | W1-W2-V2-P3 |
| ○ | ○ | ○ | X | ○ | X | ○ | ○ | W1-W2-W3 |
| ○ | ○ | ○ | X | ○ | X | ○ | X | W1-W2-W3 |
| ○ | ○ | ○ | X | ○ | X | X | ○ | W1-W2-V2-P3 |
| ○ | ○ | ○ | X | X | ○ | ○ | ○ | W1-V1-P2-V2-W3 |
| ○ | ○ | ○ | X | X | ○ | ○ | X | W1-V1-P2-V2-W3 |
| ○ | ○ | ○ | X | X | ○ | X | ○ | W1-V1-P2-P3 |
| ○ | ○ | X | ○ | ○ | ○ | ○ | ○ | P1-V1-W2-W3 |
| ○ | ○ | X | ○ | ○ | ○ | ○ | X | P1-V1-W2-W3 |
| ○ | ○ | X | ○ | ○ | ○ | X | ○ | P1-V1-W2-V2-P3 |
| ○ | ○ | X | ○ | ○ | X | ○ | ○ | P1-V1-W2-W3 |
| ○ | ○ | X | ○ | ○ | X | ○ | X | P1-V1-W2-W3 |
| ○ | ○ | X | ○ | ○ | X | X | ○ | P1-V1-W2-V2-P3 |
| ○ | ○ | X | ○ | X | ○ | ○ | ○ | P1-P2-V2-W3 |
| ○ | ○ | X | ○ | X | ○ | ○ | X | P1-P2-V2-W3 |
| ○ | ○ | X | ○ | X | ○ | X | ○ | P1-P2-P3 |
| ○ | X | ○ | ○ | ○ | ○ | ○ | ○ | W1-V1-P2-P3 |
| ○ | X | ○ | ○ | ○ | ○ | ○ | X | W1-W2-W3 |
| ○ | X | ○ | ○ | ○ | ○ | X | ○ | W1-V1-P2-P3 |
| ○ | X | ○ | ○ | ○ | X | ○ | ○ | W1-W2-W3 |
| ○ | X | ○ | ○ | ○ | X | ○ | X | W1-W2-W3 |
| ○ | X | ○ | ○ | X | ○ | ○ | ○ | W1-V1-P2-P3 |
| ○ | X | ○ | ○ | X | ○ | ○ | X | W1-V1-P2-P3 |
| ○ | X | ○ | X | ○ | ○ | ○ | ○ | W1-V1-P2-P3 |
| ○ | X | ○ | X | ○ | ○ | ○ | X | W1-W2-W3 |
| ○ | X | ○ | X | ○ | ○ | X | ○ | W1-V1-P2-P3 |
| ○ | X | ○ | X | ○ | X | ○ | ○ | W1-W2-W3 |
| ○ | X | ○ | X | ○ | X | ○ | X | W1-W2-W3 |
| ○ | X | ○ | X | X | ○ | ○ | ○ | W1-V1-P2-P3 |
| ○ | X | ○ | X | X | ○ | X | ○ | W1-V1-P2-P3 |
| ○ | X | X | ○ | ○ | ○ | ○ | ○ | P1-P2-P3 |
| ○ | X | X | ○ | ○ | ○ | ○ | X | P1-V1-W2-W3 |
| ○ | X | X | ○ | ○ | ○ | X | ○ | P1-P2-P3 |
| ○ | X | X | ○ | ○ | X | ○ | ○ | P1-V1-W2-W3 |
| ○ | X | X | ○ | ○ | X | ○ | X | P1-V1-W2-W3 |
| ○ | X | X | ○ | X | ○ | ○ | ○ | P1-P2-P3 |
| ○ | X | X | ○ | X | ○ | X | ○ | P1-P2-P3 |
| X | ○ | ○ | ○ | ○ | ○ | ○ | ○ | P1-P2-V2-W3 |
| X | ○ | ○ | ○ | ○ | ○ | ○ | X | P1-P2-V2-W3 |
| X | ○ | ○ | ○ | ○ | ○ | X | ○ | P1-P2-P3 |

TABLE 4-continued

Path state (○: normal, X: defective)

| V1 | V2 | W1 | P1 | W2 | P2 | W3 | P3 | User traffic path |
|---|---|---|---|---|---|---|---|---|
| X | ○ | ○ | ○ | ○ | X | ○ | ○ | W1-W2-W3 |
| X | ○ | ○ | ○ | ○ | X | ○ | X | W1-W2-W3 |
| X | ○ | ○ | ○ | ○ | X | X | ○ | W1-W2-V2-P3 |
| X | ○ | ○ | ○ | X | ○ | ○ | ○ | P1-P2-V2-W3 |
| X | ○ | ○ | ○ | X | ○ | ○ | X | P1-P2-V2-W3 |
| X | ○ | ○ | ○ | X | ○ | X | ○ | P1-P2-P3 |
| X | ○ | ○ | X | ○ | ○ | ○ | ○ | W1-W2-.W3 |
| X | ○ | ○ | X | ○ | ○ | ○ | X | W1-W2-W3 |
| X | ○ | ○ | X | ○ | ○ | X | ○ | W1-W2-V2-P3 |
| X | ○ | ○ | X | ○ | X | ○ | ○ | W1-W2-W3 |
| X | ○ | ○ | X | ○ | X | ○ | X | W1-W2-W3 |
| X | ○ | ○ | X | ○ | X | X | ○ | W1-W2-V2-P3 |
| X | ○ | X | ○ | ○ | ○ | ○ | ○ | P1-P2-V2-W3 |
| X | ○ | X | ○ | ○ | ○ | ○ | X | P1-P2-V2-W3 |
| X | ○ | X | ○ | ○ | ○ | X | ○ | P1-P2-P3 |
| X | ○ | X | ○ | X | ○ | ○ | ○ | P1-P2-V2-W3 |
| X | ○ | X | ○ | X | ○ | ○ | X | P1-P2-V2-W3 |
| X | ○ | X | ○ | X | ○ | X | ○ | P1-P2-P3 |
| X | X | ○ | ○ | ○ | ○ | ○ | ○ | P1-P2-P3 |
| X | X | ○ | ○ | ○ | ○ | ○ | X | W1-W2-W3 |
| X | X | ○ | ○ | ○ | ○ | X | ○ | P1-P2-P3 |
| X | X | ○ | ○ | ○ | X | ○ | ○ | W1-W2-W3 |
| X | X | ○ | ○ | ○ | X | ○ | X | W1-W2-W3 |
| X | X | ○ | ○ | X | ○ | ○ | ○ | P1-P2-P3 |
| X | X | ○ | ○ | X | ○ | ○ | X | P1-P2-P3 |
| X | X | ○ | X | ○ | ○ | ○ | ○ | W1-W2-W3 |
| X | X | ○ | X | ○ | ○ | ○ | X | W1-W2-W3 |
| X | X | ○ | X | ○ | X | ○ | ○ | W1-W2-W3 |
| X | X | ○ | X | ○ | X | ○ | X | W1-W2-W3 |
| X | X | X | ○ | ○ | ○ | ○ | ○ | P1-P2-P3 |
| X | X | X | ○ | ○ | ○ | X | ○ | P1-P2-P3 |
| X | X | X | ○ | X | ○ | ○ | ○ | P1-P2-P3 |
| X | X | X | ○ | X | ○ | X | ○ | P1-P2-P3 |
| Other cases | | | | | | | | none |

In Table 4, O and X indicate an absence and a presence, respectively, of a defect in each corresponding path. W1, W2, and W3 indicate working path 1, working path 2, and working path 3, and P1, P2, and P3 indicate protection path 1, protection path 2, and protection path 3, respectively. V1 and V2 indicate connection path 1 and connection path 2, respectively. In Table 4, for convenience of description, an end node and an interconnecting node are omitted in a user traffic path, and only a path to be used is indicated. For example, when a user traffic path is W1-V1-P2-V2-P3, it indicates that user traffic uses a path of (E1)-working path 1-(I1)-connection path 1-(I1')-protection path 2-(I2')-connection path 2-(I2)-working path 3-(E2). In Table 4, a user traffic path is indicated only when a path through which user traffic is transferred between end nodes is present, and the user traffic path is omitted when the user traffic path is absent between the end nodes due to a plurality of defects.

FIG. 9 is a diagram illustrating a signal flow of a linear protection switching-based domain connecting method according to an example embodiment.

Referring to FIG. 9, in operation 910, a working interconnecting node monitors a presence or absence of a defect in a connection path i connecting the working interconnecting node and a protection interconnecting node, and a presence or absence of a defect in a working path i or a working path i+1. In operation 915, the working interconnecting node transmits a result of the monitoring performed in operation 910 to the protection interconnecting node paired with the working interconnecting node. Although not illustrated in FIG. 9, the working interconnecting node may transmit information on a presence or absence of a defect to the protection interconnecting node on a periodic basis, but the working interconnecting node may immediately transmit the information on a presence or absence of a defect to the protection interconnecting node when the information on a presence or absence of a defect changes. Here, when the protection interconnecting node does not receive such defect information from the working interconnecting node for a certain amount of time, the protection interconnecting node may determine that the working interconnecting node itself breaks down or a defect occurs in the connection path i used for receiving the defect information.

In operation 920, the protection interconnecting node also monitors a presence or absence of a defect in the connection path i and a presence or absence of a defect in a protection path i or a protection path i+1.

In operation 930, the protection interconnecting node determines a presence or absence of a defect in the connection path i based on information on the presence or absence of the defect in the connection path i that is received from the working interconnecting path and on information on the presence or absence of the defect in the connection path i that is monitored by the protection interconnecting node. Here, even when a defect in the connection path i occurs in one direction, the protection interconnecting node may determine that a defect is present in the connection path i.

In operation 940, the protection interconnecting node determines a user traffic transceiving path to which user traffic is to be transceived between the working path i (or the working path i+1) and the protection path i (or the protection path i+1) based on information on the presence or absence of the defect in the working path i or the working path i+1 and information on the presence or absence of the defect in the protection path i or the protection path i+1.

In operation 950, the protection interconnecting node generates working path control information and protection path control information based on information on the determined user traffic transceiving path and the information on the presence or absence of the defect in the protection path i or i+1. In operation 960, the protection interconnecting node transmits the working path control information to the working interconnecting node.

In operation 970, the working interconnecting node connects two paths among the working path i, the working path i+1, and the connection path i based on the working path control information received from the protection interconnecting node. However, when a defect occurs in the connection path i and the working path control information is not received from the protection interconnecting node, the working interconnecting node may connect the working path i and the working path i+1.

In operation 980, the protection interconnecting node connects two paths among the protection path i, the protection path i+1, and the connection i based on the protection path control information. In operation 990, the protection interconnecting node transmits, to the protection path i or the protection path i+1, a linear protection switching message in which the information on the user traffic transceiving path is recorded.

According to example embodiments described herein, when connecting two protection domains to be protected by a linear protection switching method, using two interconnecting nodes may protect user traffic flowing between end nodes despite occurrence of a defect in one of the interconnecting nodes. Further, an operation of an interconnecting node suggested herein may be defined as a new function and operation that are additionally needed without a change in an existing linear protection switching function and operation, and thus existing linear protection switching technology may be used without a change.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A working interconnecting node apparatus, comprising:
an operations, administration, and maintenance (OAM) 1 connected to a working path i and configured to monitor a presence or absence of a defect in the working path i;
an OAM 2 connected to a working path i+1 and configured to monitor a presence or absence of a defect in the working path i+1;
an OAM 3 connected to a connection path i connecting a working interconnecting node and a protection interconnecting node paired with the working interconnecting node, and configured to monitor a presence or absence of a defect in the connection path i;
an end interconnection controller configured to transmit information on the presence or absence of the defect received from the OAM 1, the OAM 2, and the OAM 3 to the protection interconnecting node, and transfer working path control information received from the protection interconnecting node to a working path connector; and
the working path connector configured to connect two paths among the working path i, the working path i+1, and the connection path i based on the working path control information,
wherein the connection path i is connected to the working path i or the working path i+1 by the working path connector, the user traffic received through the working path i or the working path i+1 is transmitted to the protection interconnecting node through the connection path i, or the user traffic received through the connection path i is transmitted to the end node apparatus or an adjacent working interconnecting node apparatus in an adjacent protection domain through the working path i or the working path i+1,
wherein the user traffic is transmitted between two end nodes, and
wherein each of the working path i and the working path i+1 is for exchanging user traffic with the end node or the adjacent working interconnecting node.

2. The working interconnecting node apparatus of claim 1, wherein, when the working path control information is not received from the protection interconnecting node due to occurrence of the defect in the connection path i, the end interconnection controller is configured to generate the working path control information commanding an interconnection of the working path i and the working path i+1 and transmit the generated working path control information to the working path connector.

3. The working interconnecting node apparatus of claim 1, wherein the end interconnection controller is configured to transmit the information on the presence or absence of the defect to the protection interconnecting node on a periodic basis, and transmit the information on the presence or absence of the defect immediately when the information on the presence or absence of the defect changes.

4. A protection interconnecting node apparatus, comprising:
an operations, administration, and maintenance (OAM) configured to monitor a presence or absence of a defect in a connection path i connecting a protection interconnecting node and a working interconnecting node paired with the protection interconnecting node;
an OAM and protection (OAM&P) 1 and an OAM&P 2 respectively connected to a protection path i and a protection path i+1, and configured to monitor a presence or absence of a defect in the protection path i and the protection path i+1, each of which is used for exchanging user traffic with the end node or an adjacent protection interconnecting node in an adjacent protection domain;
a linear protection switching processor i or a linear protection switching processor i+1 configured to determine a user traffic transceiving path based on information on a presence or absence of a defect in a working path i or a working path i+1 for exchanging user traffic with the end node or an adjacent working interconnecting node in the adjacent protection domain and information on the presence or absence of the defect in the protection path i or the protection path i+1, and transmit information on the determined user traffic transceiving path to a main interconnection controller;
the main interconnection controller configured to generate working path control information and protection path control information after receiving the information on the user traffic transceiving path and the information on the presence or absence of the defect in the protection path i or the protection path i+1, and transmit the generated working path control information and the generated protection path control information to the working interconnecting node and a protection path connector, respectively; and
the protection path connector configured to connect two paths among the protection path i, the protection path i+1, and the connection path i based on the protection path control information,
wherein the connection path i is connected to the protection path i or the protection path i+1 by the protection path connector, the user traffic received through the protection path i or the protection path i+1 is transmitted to the working interconnecting node through the connection path i, or the user traffic received through the connection path i is transmitted to the end node or an adjacent protection interconnecting node through the protection path i or the protection path i+1,
wherein the user traffic is transmitted between two end nodes, and
wherein each of the protection path i and the protection path i+1 is used for exchanging user traffic with the end node or the adjacent protection interconnecting node in the case that a failure exist in the working path i or the working path i+1.

5. The protection interconnecting node apparatus of claim 4, wherein the OAM&P 1 and the OAM&P 2 are configured to transceive a linear protection switching message through the protection path i and the protection path i+1, respectively, and the linear protection switching processor i and the linear protection switching processor i+1 are configured to respectively transmit the linear protection switching message, in which the information on the determined user traffic transceiving path is recorded, to the protection path i and the protection path i+1 through the OAM&P 1 and the OAM&P 2.

6. The protection interconnecting node apparatus of claim 4, wherein the main interconnection controller is configured to receive information on the presence or absence of the defect in the connection path i, and recognize a current presence or absence of a defect in the connection path i.

7. The protection interconnecting node apparatus of claim 4, wherein, although a defect in the connection path i occurs in one direction, the main interconnection controller is configured to determine the presence of the defect in the connection path i.

8. The protection interconnecting node apparatus of claim 4, wherein the main interconnection controller is configured to transfer the information on the presence or absence of the defect in the working path i received from the working interconnecting node to the linear protection switching processor i, and transfer the information on the presence or absence of the defect in the working path i+1 to the linear protection switching processor i+1.

9. The protection interconnecting node apparatus of claim 4, wherein the main interconnection controller is configured to input information on a presence or absence of a virtual defect to the linear protection switching processors i and i+1 to change a user traffic path.

10. The protection interconnecting node apparatus of claim 4, wherein, when the information on the presence or absence of the defect is not receive from the working interconnecting node for a preset amount of time, the main interconnection controller is configured to determine that a defect occurs in the working interconnecting node or in the connection path i used for receiving defect information.

11. A linear protection switching-based domain connecting method, the method comprising:
monitoring, by a working interconnecting node, a presence or absence of a defect in a connection path i connected to a protection interconnecting node paired with the working interconnecting node, and a presence or absence of a defect in a working path i or a working path i+1 for exchanging user traffic with the end node or an adjacent working interconnecting node in an adjacent protection domain, and transmitting a result of the monitoring to the protection interconnecting node;
monitoring, by the protection interconnecting node, a presence or absence of a defect in the connection path i, and a presence or absence of a defect in a protection path i or a protection path i+1 for exchanging user traffic with the end node or an adjacent protection interconnecting node in the adjacent protection domain;
determining, by the protection interconnecting node, a user traffic transceiving path based on information on the presence or absence of the defect in the working path i or the working path i+1 and information on the presence or absence of the defect in the protection path i or the protection path i+1;
generating, by the protection interconnecting node, working path control information and protection path control information based on information on the determined user traffic transceiving path and the information on the presence or absence of the defect in the protection path i or the protection path i+1;
transmitting, by the protection interconnecting node, the working path control information to the working interconnecting node; and
connecting, by the protection interconnecting node, two paths among the protection path i, the protection path i+1, and the connection path i based on the protection path control information,
wherein the connection path i is connected to the protection path i or the protection path i+1 by the protection path connector, the user traffic received through the protection path i or the protection path i+1 is transmitted to the working interconnecting node through the connection path i, or the user traffic received through the connection path i is transmitted to the end node or an adjacent protection interconnecting node through the protection path i or the protection path i+1, and
wherein the user traffic is transmitted between two end nodes.

12. The method of claim 11, further comprising:
transmitting, by the protection interconnecting node, a linear protection switching message in which the information on the determined user traffic transceiving path is recorded to the protection path i or the protection path i+1.

13. The method of claim 11, further comprising:
recognizing, by the protection interconnecting node, a current presence or absence of a defect in the connection path i based on the information on the presence or absence of the defect in the connection path i received from the working interconnecting node and the information on the presence or absence of the defect in the connection path i obtained from the monitoring of the presence or absence of the defect in the connection path i.

14. The method of claim 11, wherein the monitoring of the presence or absence of the defect in the connection path i comprises determining the presence of the defect in the connection path i although the defect in the connection path i occurs in one direction.

15. The method of claim 11, when the information on the presence or absence of the defect is not received from the working interconnecting node for a preset amount of time, further comprising:
determining, by the protection interconnecting node, that a defect occurs in the working interconnecting node or a defect occurs in the connection path i.

16. The method of claim 11, comprising:
connecting, by the working interconnecting node, two paths among the working path i, the working path i+1, and the connection path i based on the working path control information received from the protection interconnecting node.

17. The method of claim 11, when the working path control information is not received from the protection interconnecting node due to occurrence of the defect in the connection path i, further comprising:
connecting, by the working interconnecting node, the working path i and the working path i+1.

* * * * *